(No Model.)

C. H. TUMEY.
BELL CORD COUPLING.

No. 270,705. Patented Jan. 16, 1883.

Witnesses
A. M. Tanner
Wm. H. Hadaway

Inventor
Charles H. Tumey
per Paine & Ladd
Attorneys

N. PETERS. Photo-Lithographer. Washington, D. C.

UNITED STATES PATENT OFFICE.

CHARLES H. TUMEY, OF AUSTIN, TEXAS, ASSIGNOR OF ONE-HALF TO HANCOCK & HANCOCK, OF SAME PLACE.

BELL-CORD COUPLING.

SPECIFICATION forming part of Letters Patent No. 270,705, dated January 16, 1883.

Application filed April 15, 1882. (No model.)

*To all whom it may concern:*

Be it known that I, CHARLES HENRY TUMEY, of Austin, in the county of Travis and State of Texas, have invented certain new and useful Improvements in Bell and Signal Cords, of which the following is a specification.

The object of the invention is to provide a simple and efficient device for connecting bell or signal cords on railway-trains and other places, whereby said cords are always maintained in a taut condition, all unnecessary slack being obviated.

To these ends the invention consists in the construction and combination of devices which will hereinafter be more fully described, and then set forth in the claims.

Figure 1:
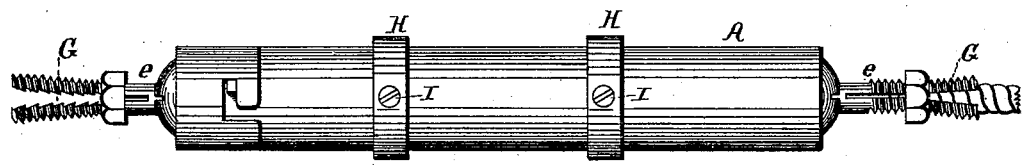
Figure 2:
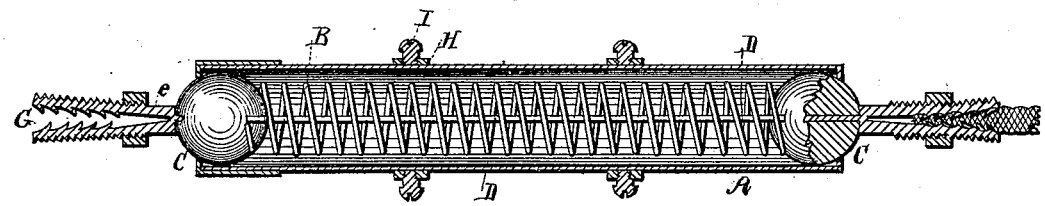
Figure 3:
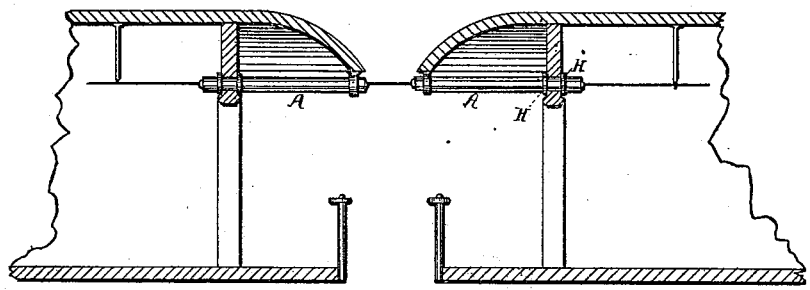
Figure 4:

In the drawings, Figure 1 is a face view of a cord connecting and tension device constructed according to my invention. Fig. 2 is a vertical section thereof. Fig. 3 is a sectional view of two railway-cars, showing my cord connecting and tension device applied thereto. Fig. 4 is a cross-section through the shell of the cord-connecting device.

The letter A designates a metallic cylinder or tube. B is a spiral spring arranged in said tube, and resting at either extremity on the metallic balls or spheres C. Through these balls a flattened piece of steel, D, is passed, which extends through the entire tube, and is made sufficiently elastic to bend readily. After passing through the balls at either end the strip D terminates in a round portion, e, and a short distance from the balls C, at either end of the strip or plate D, a nut, F, is placed. The end of the piece of steel D is split, as shown at G G, the threads being made on both sides, so as to form a complete screw when pressed together. The balls C C are made so as exactly to fit the tube A A. At either end of the tube there is a hole sufficiently large to admit the passage of the nut attached to the piece of steel, but too small to admit of the passage of the balls C C, so that the balls can only move the length of the tube in either direction.

The whole device is proposed to be inserted into the end of a railway-carriage, where it is made fast by means of the collars H H, in each of which is a set-screw, I I. These collars can be removed by loosening the set-screws, so when it is desired to put the machine in the end of a car one of the collars or bands is removed, the device inserted in a hole in the end of the car until the collar touches the wood or metallic work of the car, then the removed collar is replaced on the opposite side, and the set-screw tightened up. If this method of fastening the machine should prove insufficient, then an iron band can be made fast around either end of the tube, opening on the upper side, so as to form two pieces extending to the roof of the car, where they can be made fast.

It is proposed to place one of the above-described devices in each end of the car. Whatever is used as the cord or connection between the two is inserted in the end of the piece of steel at the split G G, and the nut screwed up until it becomes tight. On the outside, between two cars, the same process is repeated.

I claim for my invention superiority over the ordinary bell-cord, from the fact that it always remains stationary in the cars, that it can be made much more ornamental, and that when the cars become uncoupled while in motion it cannot pull through, as the connection between the cars would break first.

This apparatus can also be used through the car to hold up the cord, in which case only one end of the tube would be left open and only one nut used. The device would be suspended from the roof of the car, being constructed with a ring in the closed end, the lower or open end hanging as far down in the car as the bell-cord, and the bell-cord made fast in the split G, as above described.

Having thus described my invention, what I claim as new, and desire to secure by Letters Patent, is—

1. A cord connecting and tension device comprising essentially a shell or tube, a spiral spring, and a pair of slotted balls arranged therein, and a flat strip having round ends adapted to slide through said balls, substantially as set forth.

2. A cord connecting and tension device having a sliding spring-encircled plate provided with screw-threaded and split end portions, and nuts fitted on the latter, in combination with a tube or shell, and balls arranged in said tube, as and for the purpose set forth.

CHARLES HENRY TUMEY.

Witnesses:
MRS. M. F. GREGG,
M. D. WILLIAMS.